United States Patent [19]

Onodera et al.

[11] Patent Number: 5,540,973
[45] Date of Patent: Jul. 30, 1996

[54] MAGNETIC RECORDING MEDIUM AND A METHOD FOR MANUFACTURING SUCH MEDIUM

[75] Inventors: Katsumi Onodera, Matsumoto; Hiroyuki Nakamura, Nagano, both of Japan

[73] Assignee: Fuji Electric Co., Ltd., Kawasaki, Japan

[21] Appl. No.: 143,897

[22] Filed: Nov. 2, 1993

[30] Foreign Application Priority Data

Nov. 2, 1992 [JP] Japan .................................. 4-294205

[51] Int. Cl.$^6$ ................. B32B 3/10; G11B 5/66; B05D 5/12
[52] U.S. Cl. .............. 428/141; 428/694 T; 428/694 TR; 428/694 ST; 428/694 SG; 428/900; 427/128; 427/129; 360/131; 360/132; 360/133; 360/135
[58] Field of Search ..................... 360/131, 132, 360/133, 135; 428/900, 694 T, 694 TR, 694 ST, 694 SG, 141; 427/129, 128

[56] References Cited

U.S. PATENT DOCUMENTS

| 5,070,425 | 12/1991 | Inumochi | 360/135 |
|---|---|---|---|
| 5,328,740 | 7/1994 | Nakayama | 428/64.3 |
| 5,427,833 | 6/1995 | Nakayama | 428/64.4 |

*Primary Examiner*—Leszek Kiliman
*Attorney, Agent, or Firm*—Rossi & Associates

[57] ABSTRACT

A magnetic recording medium with improved friction and levitation characteristics and undiminished electromagnetic conversion characteristics, and a method for manufacturing such a medium, are disclosed. A magnetic recording disk substrate with Ni—P plated layers formed on both faces of an aluminum alloy substrate is given a texturing treatment using a grinding tape to form textures with a maximum cross angle within a range from 30° to 50°, and then a slurry grinding treatment to remove irregular protrusions generated during the texturing process is applied using freely moving polycrystalline diamond abrasive grains with an average size of about 1 μm or smaller.

6 Claims, 5 Drawing Sheets

5,540,973

MAGNETIC RECORDING MEDIUM AND A METHOD FOR MANUFACTURING SUCH MEDIUM

FIELD OF THE INVENTION

The present invention relates to a magnetic recording medium and to the method for manufacturing such a medium. More particularly, the manufacturing method employs technology to improve the surface-wear properties of the aforementioned magnetic recording medium.

BACKGROUND

The surface condition of a magnetic recording disk (a magnetic recording medium), which is mounted in a fixed magnetic recording device such as an external storage device for a computer, has a significant effect on both recording density and the reliability of the magnetic recording disk. If, for example, the friction coefficients are high for a magnetic recording disk surface and a recording head that engages in contact-start-stop (CSS) motion on the surface of the disk, the magnetic head will tend to stick to the magnetic recording disk surface, thus damaging the drive mechanism in the magnetic head and making the magnetic recording disk incapable of rotation. For this reason, a magnetic recording disk substrate has a special surface texture that is formed through tape-texture processing. This surface produces a large number of protrusions with a maximum roughness (R MAX) of about 800 Å to prevent the magnetic head from sticking to the surface of the magnetic recording medium. In this case, the maximum cross angle between the textures formed on the surface of the magnetic recording disk is set to 10° or lower.

However, in conventional magnetic recording disks with less than 100 MB of recording capacity (when converted to a 3.5" disk), it has been possible to use sliders made of Mn-Zn-ferrite as a magnetic head material. Further the cross angle between the textures can be made even lower than 10° because a guaranteed levitation distance of about 0.08 µm has sufficed to ensure CSS durability. However, as a guaranteed levitation distance of 0.06 µm has become a necessity due to the use of higher recording density in magnetic recording disks, and as ceramic sliders made of $Al_2O_3$. TiC are being increasingly adopted as a magnetic head material, CSS durability has become an important problem. Such a problem may be solved by increasing the maximum cross angle between the textures, but since the textures also help to strengthen magnetic orientation in the circumferential direction, an excessive increase in the maximum cross angle between the textures may decrease the strengthening effect, the squareness ratio, and the coercive force, resulting in a deterioration in the electromagnetic conversion characteristics.

Furthermore, the use of tape-texture processing on the surface of a magnetic recording disk cannot necessarily control the formation of the protrusions, and tends to produce abnormal protrusions that make it impossible to achieve a satisfactory floating distance for the magnetic head.

SUMMARY OF THE INVENTION

In light of the above problems, the present invention constitutes a method for manufacturing a magnetic recording medium that can improve the friction characteristics between a magnetic recording medium and a magnetic head, and can realize a short floating distance between the magnetic head and the magnetic recording medium.

In the present invention, the textures in a magnetic recording medium are formed so as to intersect each other such that a maximum angle of 30° to 50° is created.

In order to remove abnormal protrusions generated on the surface of the magnetic recording medium substrate as a result of the texture processing using such fixed abrasive grains as grinding tapes, it is preferable for a slurry grinding process to be added that grinds the surface of the magnetic recording medium substrate on which the textures have been formed, using a slurry-like abrasion liquid containing free abrasive grains.

The free abrasive grains used in this slurry grinding process may be alumina abrasive grains with an average grain size of 1 µm or smaller. However, polycrystalline diamond abrasive grains with an average grain size of 1 µm or smaller are preferable because the material improves the coercive force and squareness ratio.

In the magnetic recording medium, the maximum cross angle between the textures formed on the magnetic recording medium substrate is larger than 30° which allows the friction characteristics between the magnetic recording medium and magnetic head to be improved. On the other hand, because the upper limit of this cross angle is set to 50°, an extreme decrease in magnetic orientation can be prevented, and the electromagnetic conversion characteristics of the magnetic recording medium can be preserved.

While the texture grinding method that uses abrasive grains bonded and fixed on a tape such as a grinding tape has a high ability to grind the surface of the magnetic recording medium substrate, it often produces irregular protrusions in the form of burrs. In contrast, a grinding process that uses slurry containing free abrasive grains can remove these abnormal protrusions. Because each abrasive grain is able to move freely during the grinding process, the burrs are not generated, and high grinding efficiency is realized. Complete removal of abnormal protrusions can improve the levitation characteristics of the magnetic recording medium.

As described above, the method for manufacturing the magnetic recording medium is characterized by setting the maximum cross angle between the textures in a range from 30° to 50°, which reserves the electromagnetic conversion characteristics. Setting the maximum cross angle between the textures at a large value also allows the friction characteristics between the magnetic recording disk and magnetic head, and the CSS characteristics, to be improved without sacrificing the electromagnetic characteristics.

In addition, when slurry grinding is performed after the texturing process, the magnetic disk levitation characteristics can be improved because irregular protrusions generated in the texturing process are removed in the slurry grinding process. If polycrystalline diamond abrasive grains are used as free abrasive grains in the slurry grinding process, sharp grooves with a fine pitch are formed in the circumferential direction. This improves the magnetic characteristics of a disk in its circumferential direction, since anisotropy in the plane is eliminated, and allows the upper limit of the cross angle between the textures to be increased.

DETAILED DESCRIPTION OF THE PREFERRED EMBODIMENTS

Figure 1:
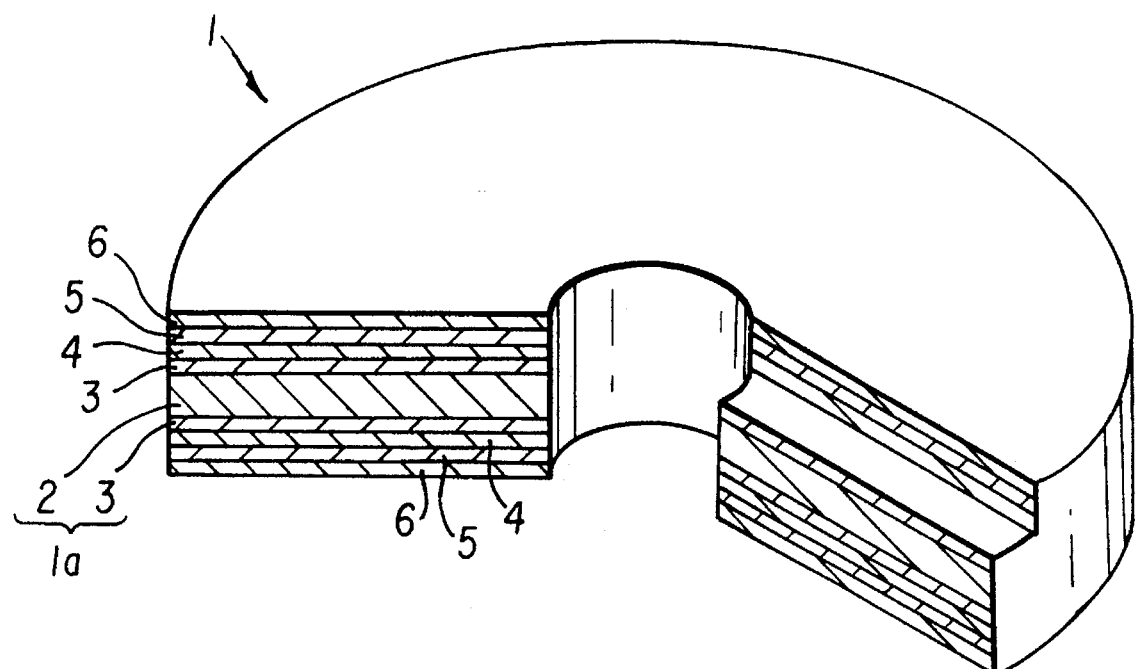
FIG. 1 is a summarized perspective view of a magnetic recording disk according to a first embodiment of the present invention, with part of the disk cut out and shown.

FIG. 1 is a summarized perspective view of a magnetic recording disk (magnetic recording medium) according to a first embodiment of the present invention, with part of the disk cut out and shown. In the figure, a magnetic recording disk 1 (magnetic recording medium), includes a magnetic recording disk substrate 1a having an Ni—P plated layer 3, base metal layer, formed by means of electroless plating on both surfaces of an aluminum alloy substrate 2 (non-magnetic base substance). The magnetic recording disk 1 has, on the surface of the magnetic recording disk substrate 1a a non-magnetic metal under layer 4, such as a Cr layer, a ferro-magnetic alloy magnetic layer 5, such as a Co alloy layer formed using a sputtering process on the non-magnetic metal layer 4, and a surface-protecting layer 6, such as a carbon layer formed using a sputtering process on the ferro-magnetic alloy magnetic layer 5. The surface of the surface-protecting layer 6 is coated with a lubricant. The surface of the Ni—P plated layer 3 has fine irregularities (textures) formed after mirror finishing, and these irregularities influence the surface of the magnetic recording disk 1, where the same irregularities are formed.

These textures are formed by rotating the magnetic recording disk substrate 1a in a circumferential direction while a grinding tape is kept in contact with the magnetic recording disk substrate 1a, and moved with vibration in the radial direction of the magnetic recording disk substrate 1a. This texture-forming method creates textures that intersect each other, and form cross angles. The maximum value of these cross angles ranges from 30° to 50° in the magnetic recording disk 1 according to this embodiment. Abnormal protrusions generated when the textures are formed are removed completely by a slurry grinding process, performed after the texturing process. Therefore, the magnetic recording disk 1 according to this embodiment has improved surface friction characteristics as a result of the textures with a maximum cross angle of 30° or larger, as described later in detail based on data. Because this configuration makes it more difficult for a magnetic head to get stuck on the surface of the magnetic recording disk 1, even if the magnetic head repeated the CSS operation on the surface of the magnetic recording disk 1, damage to the drive mechanism in the magnetic head and similar troubles caused by the magnetic recording disk 1 becoming unable to rotate are less likely to occur. Since the maximum cross angle between the textures is set to 50° or smaller, this also means that magnetic orientation is not decreased severely, and good electromagnetic conversion characteristics are maintained. Since irregular protrusions are eliminated from the surface of the magnetic recording disk 1, the levitation distance of the magnetic head can be reduced, and the density of recording tracks on the magnetic recording disk 1 can be increased.

Explanations are given hereunder on a method for manufacturing the magnetic recording disk 1 constructed as described above.

First, the Ni—P plated layer 3 is formed using electroless plating on the surface of an aluminum alloy substrate 2 which is about 3.5" in diameter, and a mirror finish is then applied to smooth its surface. Thus, a magnetic recording disk substrate 1a made of a non-magnetic material is formed.

Next, the surface of the magnetic recording disk 1 is textured to improve its friction characteristics. In this process, a grinding tape with #6000 as similar size abrasive grains bonded and fixed on the tape is used to form fine irregularities on the surface of the Ni—P plated layer 3. In this process, the grinding face of the grinding tape is moved across the magnetic recording disk substrate 1a while the magnetic recording disk substrate 1a is rotated in its circumferential direction. The grinding tape is moved at a predetermined speed, and the back of the grinding tape being pressed by a rubber roller or similar object that the surface of the magnetic recording disk substrate 1a is ground with a fresh part of the grinding tape. The grinding tape is moved with vibration in the radial direction of the magnetic recording disk 1a to provide a predetermined cross angle to the textures. The maximum value of this cross angle is set to a range from 30° to 50°. During this process, cooling fluid is supplied between the grinding tape and the magnetic recording disk substrate 1a. Incidentally, the texturing process is not limited to only one operation, but may be carried out more than once at different relative moving condition between the magnetic recording disk 1 and grinding tape.

In order to remove abnormal protrusions formed on the surface of the magnetic recording disk substrate 1a during the texturing process, a slurry grinding is executed on the surface of the magnetic recording disk substrate 1a (the surface layer of the Ni—P plated layer 3). In this slurry grinding process, freely moving abrasive alumina grains are used rather than a grinding tape with fixed abrasive grains, as in the texturing process. With an average grain size of about 1 μm or less, these free abrasive grains are smaller than the fixed abrasive grains used in the texturing process. In the slurry grinding process, a belt-formed fabric 7 is pressed onto the surface of the Ni—P plated layer 3 by a rubber roller with a surface hardness of about 50 or similar implement. As graphically shown in FIG. 2, the fabric 7 is moved at a predetermined speed so that a fresh face is always in contact with the surface of the magnetic recording disk substrate 1a. A slurried grinding fluid 9 with the free abrasive grains 8 dispersed in pure water is supplied between the fabric 7 and the Ni—P plated layer 3. The fabric 7 is moved with vibration in the radial direction of the magnetic recording disk substrate 1a, which is rotated in its circumferential direction. As a result of these movements, the entire surface of the Ni—P plated layer 3 is thinly ground. The rotation speed of the magnetic recording disk substrate 1a and the vibrating motion of the fabric 7 in the radial direction of the magnetic recording disk substrate 1a are adjusted so that grooves formed by the grinding will form about 2° cross angles to each other. The fabric 7 itself has no grinding and cutting functions; rather the free abrasive grains 8 move between the fabric 7 and the Ni—P plated layer 3. Moreover, the back of the fabric 7 is pressed by an elastic rubber roller. These factors allow the slurry grinding process to efficiently remove irregular protrusions existing on the surface without creating burrs, which is not the case when grinding tape is used. As a result, the slurry grinding process can thinly grind only the outermost surface of the Ni—P plated layer 3, and does not damage the previously formed textures.

Next, the non-magnetic metal under layer 4, the ferromagnetic alloy magnetic layer 5, and the surface-protecting layer 6 are formed in that order on the surface of the Ni—P plated layer 3 using a sputtering process.

In the method for manufacturing the magnetic recording disk 1 according to this embodiment, a slurry grinding using free abrasive grains is performed after a texturing process using a grinding tape. This procedure ensures that the surface of the magnetic recording disk has no irregular protrusions, but does not affect the existing textures.

The next section discusses the friction characteristics, levitation characteristics, and electromagnetic conversion characteristics of the magnetic recording disk 1 obtained by using the manufacturing method according to the first embodiment.

Figure 3:
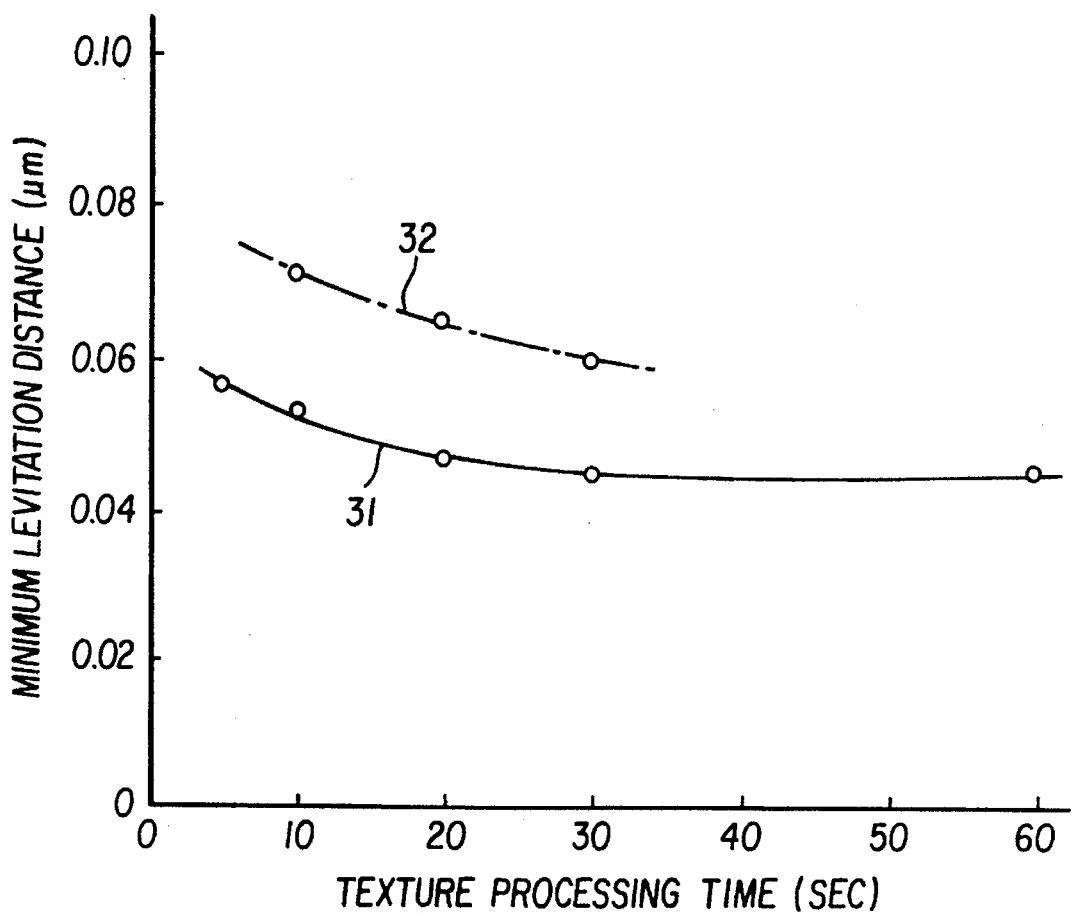
FIG. 3 is a graph showing texture processing time as a function of minimum levitation distance for the magnetic head above the magnetic recording disk, in magnetic recording disks according to the first embodiment of the present invention and manufactured according to conventional methods.

FIG. 3 shows solid lines 31 that indicate the measured relationship between minimum levitation distance of a magnetic head above the magnetic recording disk 1 of this example and texture processing time in the texturing process. This minimum levitation distance has been defined as the distance that ensures that the magnetic head will not collide with irregular protrusions on the surface of the magnetic recording disk. The relationship was also measured between minimum levitation distance of a magnetic head and texture processing time in a magnetic recording disk manufactured using the conventional, tape-texture-only processing method. These results are shown in FIG. 3 using chain lines 32.

FIG. 3 shows the magnetic recording disk 1 in this example can decrease the levitation distance down to about 0.05 μm, while the conventional magnetic recording disk requires a minimum distance to 0.06 μm. Since the magnetic recording disk 1 of this example allows a smaller levitation distance, its recording track density can be increased.

The relationship between friction coefficient and a minimum cross angle after a 60 minute drag test will now be discussed.

Figure 4:
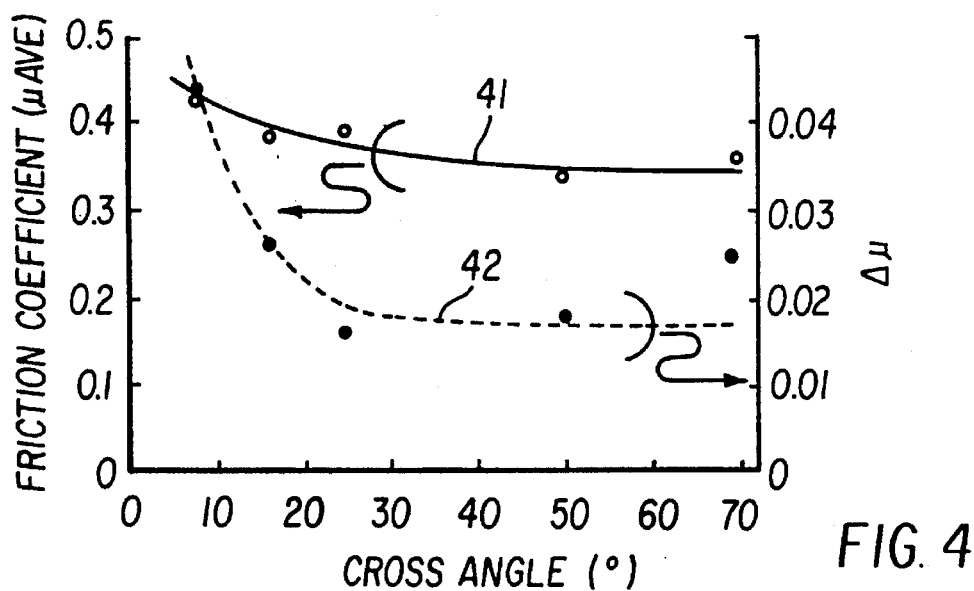
FIG. 4 is a graph showing friction coefficient as a function of maximum texture cross angle according to a continuous sliding test conducted on magnetic recording disks according to the first embodiment of the present invention.

A drag test (continuous sliding test) was performed on the magnetic recording disk 1 of this example to measure the relationship between average friction coefficient ($\mu_{ave}$) and maximum cross angle between the textures. In FIG. 4, solid lines 41 indicate the measured results and dotted lines 42 indicate $\Delta\mu$. As the figure shows, the average friction coefficient ($\mu_{ave}$) tends to very inversely with the maximum cross angle at maximum cross angles of 30° or below. At maximum cross angle, larger than 30° however the average friction coefficient ($\mu_{ave}$) remains near its lowest value. The maximum cross angle (30°–50°) set in the magnetic recording disk 1 of this embodiment is a condition that the average friction coefficient ($\mu_{ave}$) can be retained sufficiently low.

The relationship between a variation in the friction coefficient μ associated with repeated CSS operations and the maximum cross angle will now be discussed.

Figure 5:
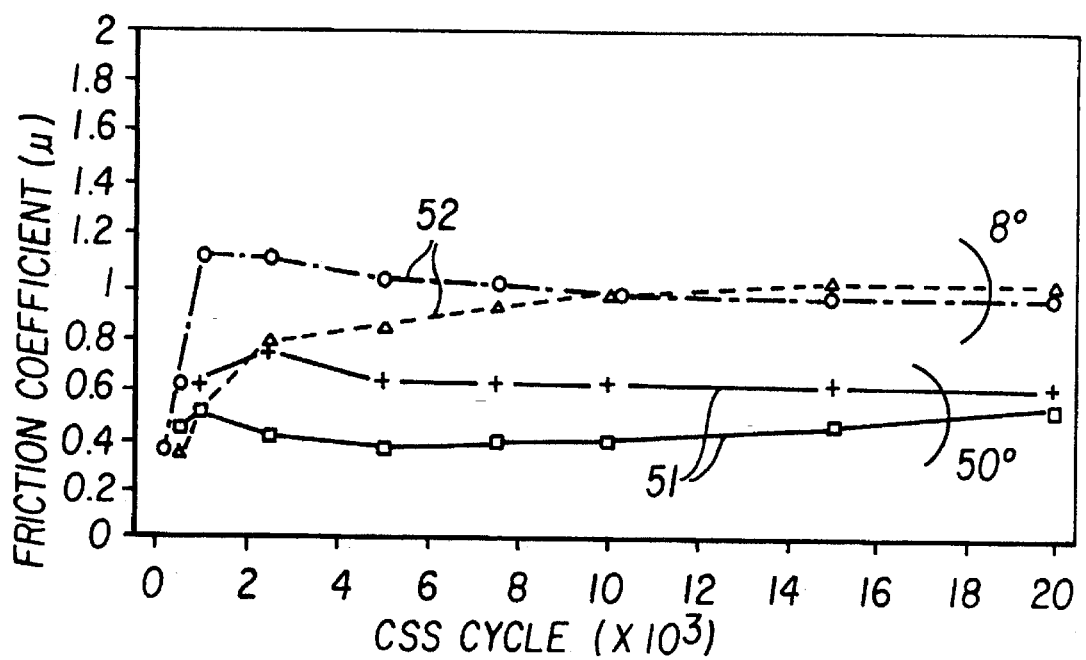
FIG. 5 is a graph showing a comparison of the CSS results for a magnetic recording disk with a maximum texture cross angle of 50° according to the first embodiment of the present invention with the CSS results for a comparable magnetic recording disk with a maximum texture cross angle of 8°.

FIG. 5 shows the relationship between the number of CSS operations given on a magnetic head ($Al_2O_3$. TiC head) loaded with a 10–gf load on its surface and a friction coefficient u on the surfaces of the magnetic head and the magnetic recording disk for two magnetic recording disks; one with a maximum cross angle of 8° and the other with a maximum cross angle of 50°. The solid lines 51 and dotted lines 52 portray data for the 50° and 80 disk, respectively. Data for the two test specimens used is shown in FIG. 5.

As FIG. 5 indicates, while the friction coefficient (μ) for the magnetic recording disk with the maximum cross angle of 50° had a value of about 0.6 even after 20000 cycles of CSS operation, the friction coefficient (μ) for the magnetic recording disk with the maximum cross angle of 8° reached a value of about 1.0 in a relatively early part of the test, exceeding the threshold value. This means that, the surface of the magnetic recording disk with the maximum cross angle of 50°, was maintained in good condition even after repeated CSS operations.

The relationship between electromagnetic conversion characteristics and maximum cross angle will now be discussed.

Figure 6:
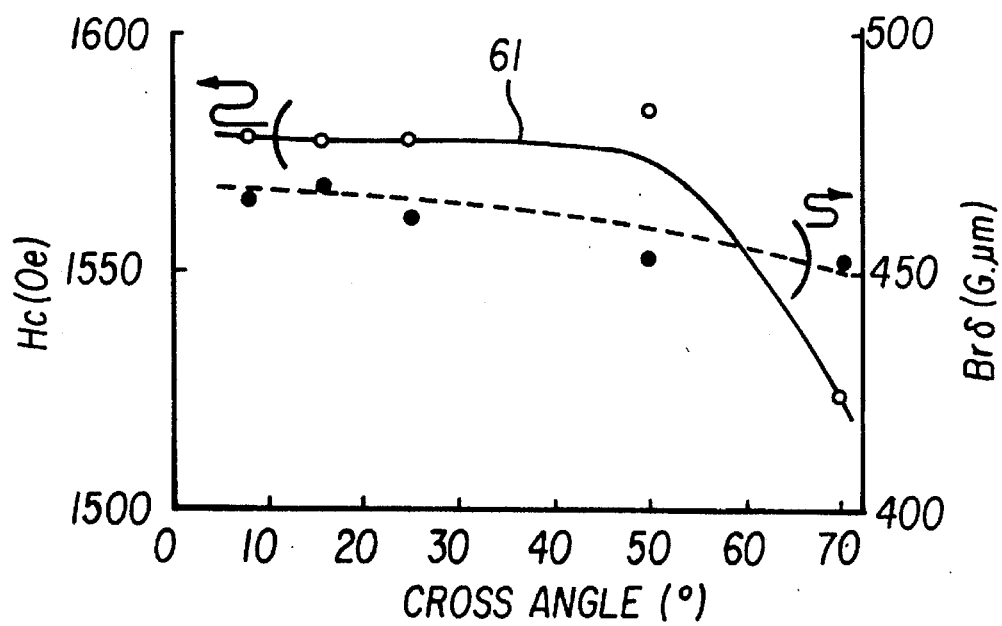
FIG. 6 is a graph showing coercive force as a function of maximum texture cross angle to the magnetic recording disk according to the first embodiment of the present invention.

The relationship between coercive force (Hc) in the magnetic recording disk of this embodiment and the maximum cross angle between the textures is shown in FIG. 6. In the figure, solid lines 61 show the relationship between the coercive force (Hc) and the maximum cross angle, while dotted lines 62 indicate the relationship between residual magnetic flux density (Br δ) and the maximum cross angle.

Figure 7:
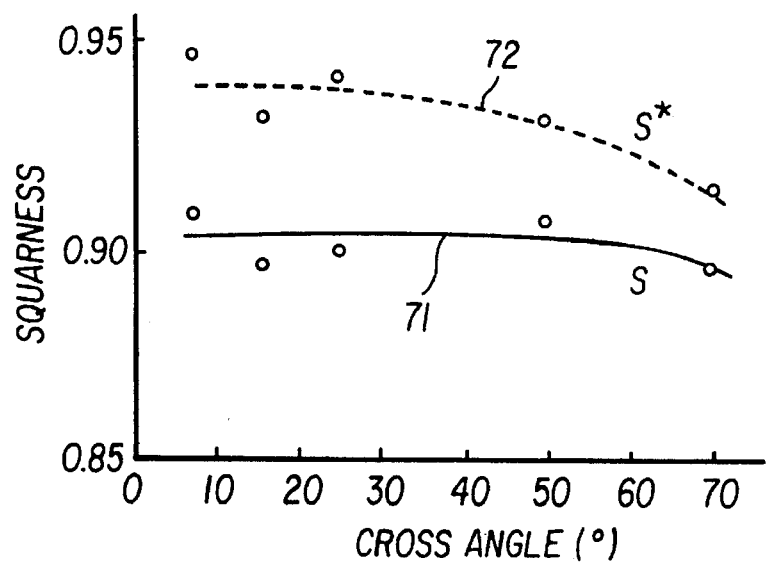
FIG. 7 is a graph showing the squareness ratio as a function of maximum texture cross angle in the magnetic recording disk according to the first embodiment of the present invention.

In addition, FIG. 7 shows the relationship between squareness ratio (S) in the magnetic recording disk of this embodiment and the maximum cross angle between the textures. In the figure, solid lines 71 show the relationship between the squareness ratio (S) and the maximum cross angle, while dotted lines 72 indicate the relationship between coercive force squareness ratio (S*) and the maximum cross angle.

As described earlier, the magnetic recording disk 1 with a large maximum cross angle between the textures can be judged from the results shown in FIGS. 4 and 5 to have good CSS and friction characteristics. On the other hand, as shown in FIGS. 6 and 7, the magnetic recording disk 1 with a maximum cross angle between the textures ranging from 30° to 50° maintains relatively large values for all the factors defining electromagnetic conversion characteristics: coercive force (Hc). Residual magnetic flux density (Br), squareness ratio (S) and coercive force squareness ratio (S*). In contrast, the magnetic recording disk with a maximum cross angle exceeding 50° tends to show large decreases in coercive force (Hc), residual magnetic flux density (Br), squareness ratio (S) and coercive force squareness ratio (S*).

Since the maximum cross angle between the textures is set to about 30° or larger in the magnetic recording disk of this embodiment, the friction characteristics of the magnetic head can be enhanced; as described earlier. On the other hand, since the upper limit is set to about 50°, the electromagnetic conversion characteristics in the magnetic recording disk 1 are not sacrificed. In addition, since irregular protrusions generated in the texturing process are removed in the slurry grinding process, a small levitation distance between the magnetic head and magnetic recording disk 1 can be realized. Therefore, the magnetic recording disk 1 of this embodiment allows both recording density and reliability to be improved.

The following section describes a magnetic recording disk according to a second embodiment of the present invention, and a method for manufacturing such a disk. The basic configuration for the magnetic recording disk of this embodiment is similar to that for the magnetic recording disk of the first embodiment, hence an explanation is omitted.

Figure 2:
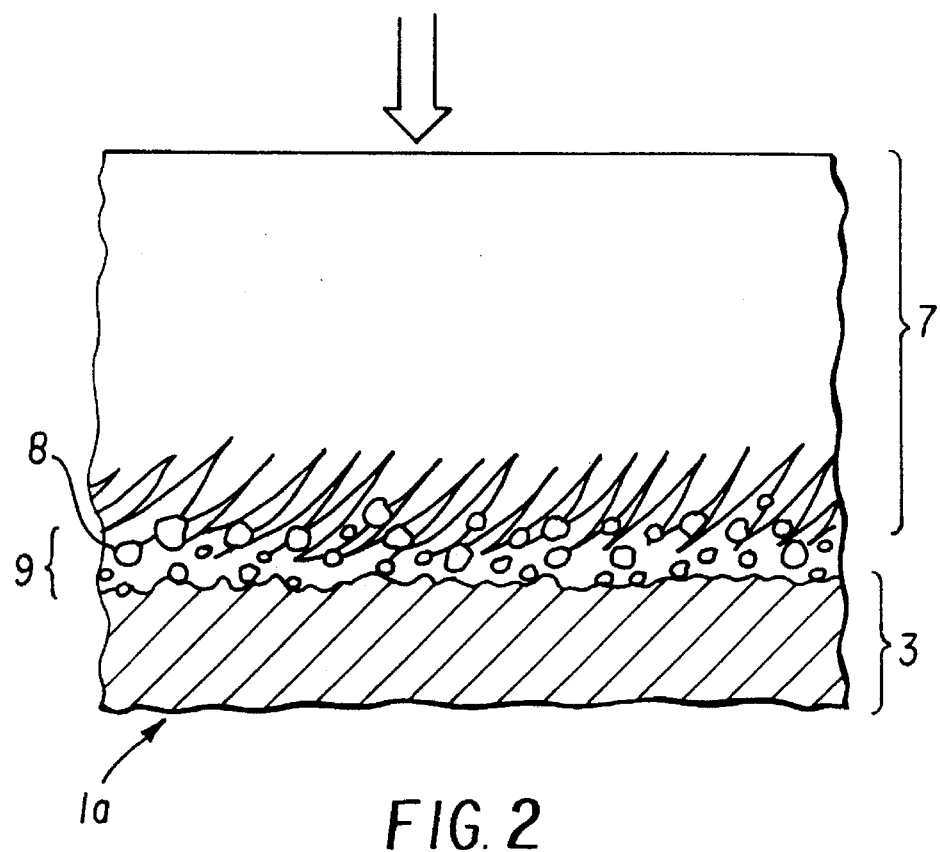
FIG. 2 is a conceptional drawing showing a magnetic recording disk in a slurry grinding process, based on the method for manufacturing the magnetic recording disk according to the first embodiment of the present invention.

The basic process in the method for manufacturing the magnetic recording disk of this embodiment is also similar to that for the magnetic recording disk of the first embodiment, hence an explanation is provided only for its characteristic points. FIGS. 1 and 2 shows these characteristic points.

First, similarly to the method for manufacturing the magnetic recording disk of the first embodiment, an Ni—P plated layer 3 is formed on the surface of an aluminum alloy substrate 2, and a magnetic recording disk substrate 1a is formed. Then, the surface of the magnetic recording disk 1 is textured to improve its friction characteristics. In this process, a grinding tape with #6000 or similar sized abrasive grains, bonded and fixed on the tape is used to form fine irregularities on the surface of the Ni—P plated layer 3. Specifically, the magnetic recording disk substrate 1a is rotated in its circumferential direction, and the grinding tape is moved vibratingly on the surface of the magnetic recording disk substrate 1a along its radius to provide a completely textured surface with a predetermined maximum cross angle between the textures. In this embodiment, the maximum cross angle between the textures is set to about 30°.

Then, a slurry grinding process is executed to remove irregular protrusions formed on the surface of the magnetic recording disk substrate 1a. In this slurry grinding process, the method for manufacturing the magnetic recording disk of this embodiment uses freely moving poly-crystalline diamond abrasive grains. As shown in FIG. 2, a belt-formed fabric 7 is pressed onto the surface of the Ni—P plated layer 3 using a rubber roller or similar device. In this state, a slurried grinding fluid 9 with free abrasive grains 8 dispersed in pure water is supplied between the fabric 7 and the Ni—P plated layer 3. The fabric 7 is moved vibratingly in the radial direction of the magnetic recording disk substrate 1a, while the magnetic recording disk substrate 1a is rotated in its circumferential direction. These movements combine to produce a thinly ground surface over the entire Ni—P plated layer 3. The rotation speed of the magnetic recording disk substrate 1a and the vibrating motion of the fabric 7 in the radial direction of the magnetic recording disk substrate 1a are adjusted so that grooves formed by the grinding will maintain about a 2° cross angle to one other. Therefore, this slurry grinding process can remove efficiently irregular protrusions existing on the surface without creating burrs, which is not the case when a grinding tape is used. Since the process grinds thinly only the outermost surface of the Ni—P plated layer 3, the textures previously formed remain undamaged.

Next, a non-magnetic metal under layer 4, a ferromagnetic alloy magnetic layer 5, and a protective layer 6 are formed in that order on the surface of the Ni—P plated layer 3 using a sputtering process.

In the method for manufacturing the magnetic recording disk 1 according to this second embodiment, a slurry grinding using free abrasive grains is performed after a texturing process using a grinding tape. Consequently, the surface of the magnetic recording disk has no irregular protrusions, and the textures are unaffected.

In the magnetic recording disk 1 of this embodiment, the ferromagnetic alloy magnetic layer 5 is formed while the magnetic recording disk is free of in-plane anisotropy. To elaborate, recording disk 1, as shown in the graph in FIG. 8, after Ni—P layer 3 and the non-magnetic metal base layer 4 form on the magnetic recording disk 1, the disk is transported in the direction shown by the arrow "A". Position "B" can be regarded as a position in which a line tangent to the texture direction, which goes parallel with the circumference, forms an angle 0° with the disk's direction of transportation. At the same time, position "C" can be regarded as a position in which a line tangent to the direction of the textures forms an angle of 90° with the disk's direction of transportation. While the ferromagnetic alloy metal layer 5 may easily generate a magnetic orientation in these positions, it has been verified in the magnetic recording disk 1 of this embodiment that the coercive force (Hc) in position "B" is equivalent to that in position "C".

Figure 8:
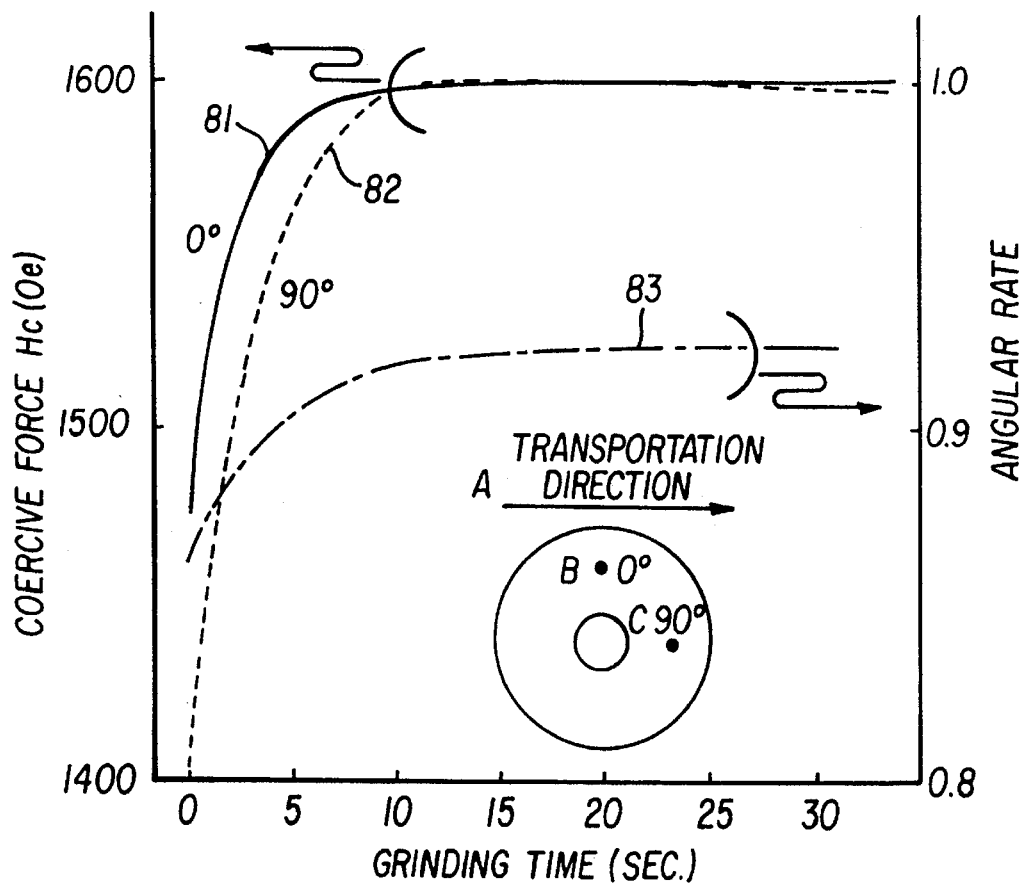
FIG. 8 is a graph showing slurry grinding time dependence of the coercive force and the squareness ratio in the magnetic recording disk according to the second embodiment of the present invention.

Specific details, about the relationship between the coercive force (Hc) in positions "B" and "C" for the magnetic recording disk 1 and the grinding time during the slurry grinding process are provided in FIG. 8. The solid lines 81 in the figure show the relationship between coercive force (Hc) and slurry grinding time in position "B" (i.e., the position with a 0° angle relative to the transportation direction). The dotted lines 82 shows the relationship between coercive force (Hc) and slurry grinding time in position "C" (i.e., the position with a 90° angle relative to the transportation direction). As the figure indicates, if the slurry grinding is performed for longer than a certain duration, the difference in coercive force between positions "B" and "C" on the plane of the magnetic recording disk, or the in-plane anisotropy, tends to diminish. This trend does not appear if such free abrasive grains as alumina, SiC, or monocrystalline diamond are used. A possible explanation may be interpreted that the polycrystalline diamond, which has of numerous sharp cutting edges on each particle, forms finepitched grooves on the surface of the magnetic recording disk substrate 1a in the circumferential direction, and aligns the crystallizing direction in the non-magnetic metal under layer 4 in the desired direction, thereby improving the magnetic orientation of the ferromagnetic alloy metal layer 5 in the circumferential direction.

Figure 9A:
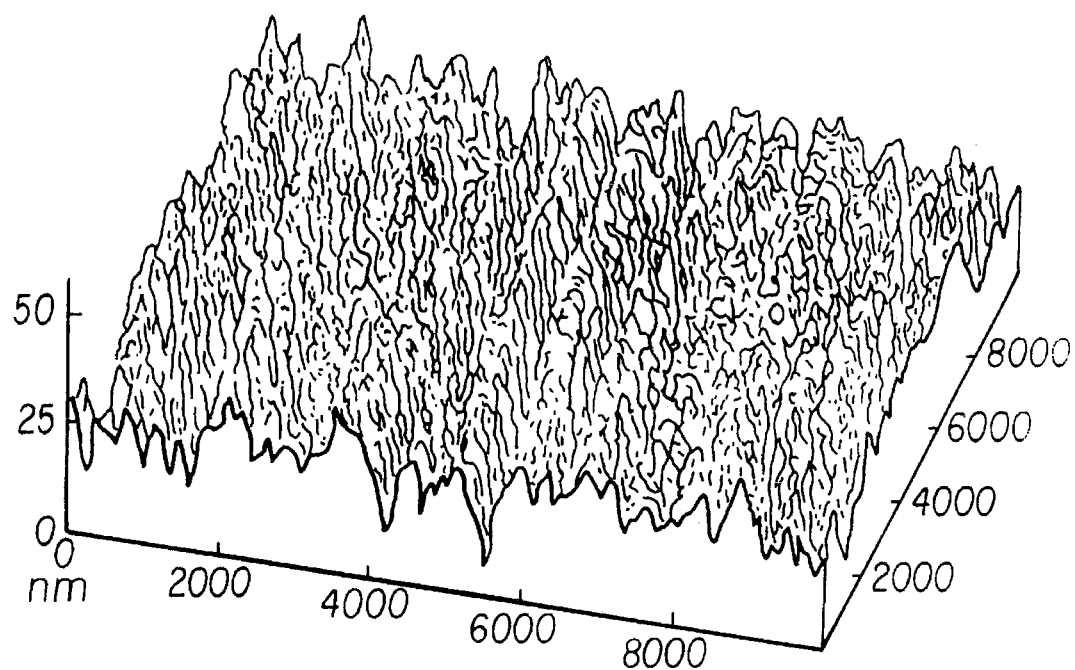
FIG. 9(a) is a descriptive drawing showing graphically the result of an STM observation on the surface of a magnetic recording disk substrate when slurry grinding using polycrystalline diamond abrasive grains is applied on an untextured magnetic recording disk substrate.
Figure 9B:
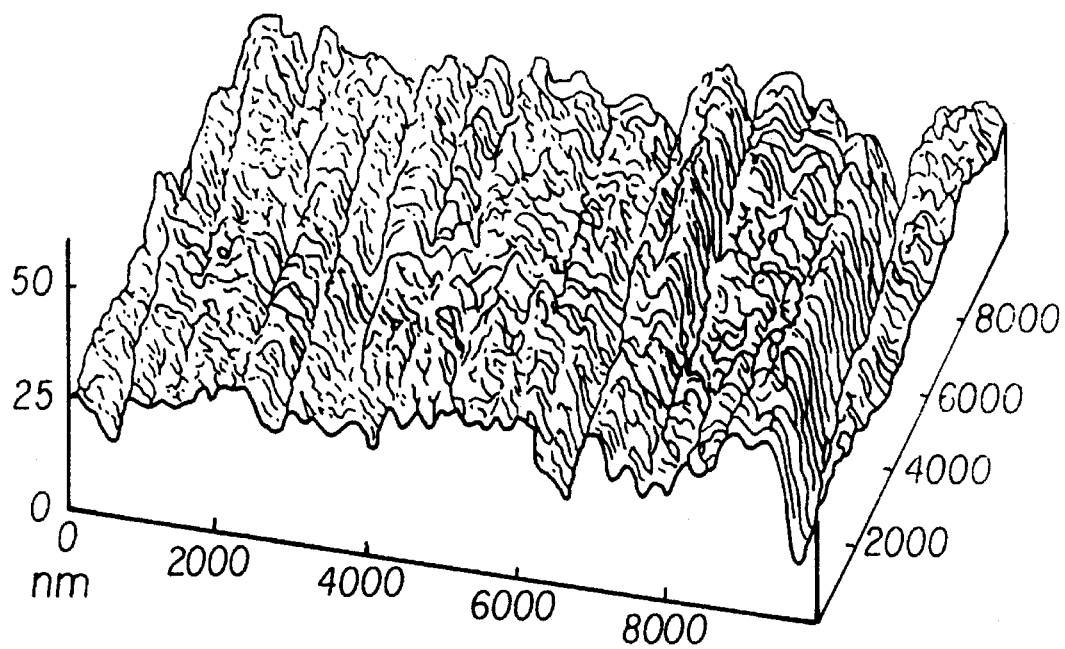
FIG. 9(b) is a descriptive drawing of grinding process where the above grinding is performed using alumina abrasive grains.

To explain in more detail, slurry grinding was carried out using polycrystalline diamond abrasive grains on the surface of a magnetic recording disk substrate 1a on which no textures had been formed, and the surface was observed using an STM. As the graph in FIG. 9(a) shows, a large number of sharp grooves have been formed on the surface that have finer pitches than those produced by alumina abrasive grains (as shown in FIG. 9(b)). The directionality of these grooves has improved the magnetic orientation (i.e., magnetic characteristics, including coercive force in the ferromagnetic alloy metal layer 5 over that of conventional products, which are processed straight to form a maximum cross angle of 10° or less. FIG. 8 shows the relationship between the squareness ratio (S) and the slurry grinding time, using dotted lines 83. The squareness ratio (S) is no different in positions "B" and "C".

The magnetic recording disk 1 of this embodiment was measured to determine the minimum levitation distance for the magnetic head, the friction coefficient 60 minutes after a drag test had been completed, the variation of the friction coefficient μ as a result of repeated CSS operations, and the electromagnetic conversion characteristics. It has been verified that the levitation characteristics of the magnetic recording disk has been improved because the irregular protrusions generated in the texturing process have been removed, as in the magnetic recording disk according to the first embodiment; that the friction characteristics between the magnetic recording disk and the magnetic head are good because the maximum cross angle between the textures formed by the texturing process has been set to greater than about 30°; and that the electromagnetic conversion characteristics are good because of the maximum cross angle has been set to less than about 50°.

As described in the method for manufacturing a magnetic recording disk according to this embodiment, the in-plane anisotropy in the electromagnetic conversion characteristic of the disk can be eliminated and the levitation characteristics and friction characteristics improved. This is accomplished by setting the maximum cross angle between the textures sufficiently large that the electromagnetic characteristics will not degrade, and removing the irregular protrusions using slurried grinding fluid. Furthermore, because sharp grooves with fine pitches are formed in the circumferential direction by means of the slurry grinding process utilizing polycrystalline diamond abrasive grains, the circumferential magnetic characteristics of the disk are improved, and the electromagnetic conversion characteristics will not degrade significantly even if the upper limit of the maximum cross angle between the textures is increased.

In addition, in the method for manufacturing the magnetic recording disk of any of the embodiments, the grain sizes of the free abrasive grains can be changed according to the condition of the irregular protrusions generated during the texturing process. Although grains of the same sizes as those used on grinding tape may be used, free abrasive grains with sizes smaller than 1 μm will also suffice to treat any type of irregular protrusion. In mixing the free abrasive grains into slurried grinding fluid, pure water and any type of solvent may be used. Furthermore, the materials used in each layer of the magnetic recording medium, the manufacturing conditions thereof, and the pressing method used for the fabric during the slurry grinding process can also be selected with wide latitude to suit the magnetic recording medium and abrasive grains used.

The invention has been described with reference to certain preferred embodiments thereof. It will be understood, however, that modifications and variations are possible within the scope of the appended claims.

What is claimed is:

1. A magnetic recording medium comprising:
    a non-magnetic substrate including a textured surface having grooves that intersect one another to form a maximum cross angle ranging from 30° to 50°, said grooves including circumferential grooves that extend substantially circumferentially along the textured surface; and
    a magnetic layer formed on the textured surface of the non-magnetic substrate.

2. A method for manufacturing a magnetic recording medium comprising steps of:
    texturing a surface of a non-magnetic substrate using a texturing process, such that said surface includes grooves that intersect one another to form a maximum cross angle ranging from 30° to 50°, said grooves including circumferential grooves that extend substantially circumferentially along the textured surface; and
    forming a magnetic layer on said surface of the non-magnetic substrate after the texturing step.

3. A method for manufacturing a magnetic recording medium as claimed in claim 2, further comprising a step of slurry grinding said surface of the non-magnetic substrate after said texturing step, using slurry grinding fluid containing free abrasive grains.

4. A method for manufacturing a magnetic recording medium as claimed in claim 3, wherein alumina abrasive grains having an average grain size of 1 μm or smaller are used as said free abrasive grains in said slurry grinding step.

5. A method for manufacturing a magnetic recording medium as claimed in claim 3, wherein polycrystalline diamond abrasive grains having an average grain size of 1 μm or smaller are used as said free abrasive grains in said slurry grinding step.

6. A magnetic recording medium comprising:
    a non-magnetic substrate including a textured surface having grooves that intersect one another to form a maximum cross angle ranging from 30° to 50°, wherein said grooves include circumferential grooves that extend substantially circumferentially along the textured surface and the textured surface is treated by grinding with a slurry grinding fluid containing free abrasive grains; and
    a magnetic layer formed on the textured surface of the non-magnetic substrate.

* * * * *